United States Patent [19]
Kraemer et al.

[11] 3,840,380
[45] Oct. 8, 1974

[54] NOVEL PREPARATION OF HYDRATED MIXED SILICATES

[75] Inventors: Stefan Kraemer, Essen; Michael Seger, Krefeld-Linn; Alois Seidl, Thurnstein, all of Germany

[73] Assignee: Wasagchemie GmbH, Munich, Germany

[22] Filed: July 22, 1971

[21] Appl. No.: 165,315

[52] U.S. Cl.................. 106/74, 106/40 R, 106/75
[51] Int. Cl...... C04b 33/02, C04b 21/00, C09j 1/02
[58] Field of Search............ 106/40 R, 40 V, 50, 51, 106/117, DIG. 8, 74; 423/333; 252/313 S

[56] References Cited
UNITED STATES PATENTS

| | | | |
|---|---|---|---|
| 3,537,815 | 11/1970 | Burke, Jr. | 423/333 |
| 3,184,371 | 5/1965 | Seidl | 161/193 |
| 3,261,894 | 7/1966 | Seidl | 106/40 R |
| 3,652,310 | 3/1972 | Kraemer | 106/40 R |

FOREIGN PATENTS OR APPLICATIONS

| | | | |
|---|---|---|---|
| 576,335 | 3/1946 | Great Britain | 106/52 |
| 576,579 | 4/1946 | Great Britain | 106/52 |

*Primary Examiner*—Winston A. Douglas
*Assistant Examiner*—Mark Bell
*Attorney, Agent, or Firm*—Hammond & Littell

[57] ABSTRACT

An improved method of forming a hydrated mixed silicate powder from broken or chunk glass by dissolving the broken or chunk glass and oxidic and/or siliceous materials in a rolling autoclave or similar milling apparatus which constantly renews the glass surface to shorten the dissolving time.

7 Claims, No Drawings

NOVEL PREPARATION OF HYDRATED MIXED SILICATES

STATE OF THE ART

U.S. Pat. No. 3,184,371 and DAS No. 1,671,266 disclose that fibrous or pulverulent siliceous and/or alkali soluble oxidic materials with or without water-soluble organic compounds may be dissolved in an aqueous alkali silicate solution at temperatures of 80° to 100°C with stirring, cyclic pumping and/or wet grinding. The slight dissociation of the alkali silicate into sodium hydroxide and silicic acid produced by dissolution at approximately 20°C is essentially increased at higher temperatures and produces the prerequisites for the dissolving process.

This process requires extensive equipment which is expensive and requires prolonged dissolving time. First, the alkali silicate produced by melting and in the shape of broken pieces dissolves at elevated temperatures and a steam overpressure and the resulting solution is then diluted with water to initiate the dissociation of the water glass solution. The oxidic and/or siliceous materials are dissolved therein by a complicated disintegration process and simultaneously or after, the solution is concentrated by evaporation of water to a moisture content of 55 to 65 percent and finally dried to obtain a mixed silicate with a moisture content of 5 to 20 percent.

OBJECTS OF THE INVENTION

It is an object to provide an improved process for dissolution of broken glass in a shorter period of time than known processes.

It is a further object of the invention to provide a novel process for the simultaneous dissolution of alkali silicate and disintegration of oxidic and/or siliceous materials.

These and other objects and advantages of the invention will become obvious from the following detailed description.

THE INVENTION

The novel process of the invention comprises admixing alkali metal silicates produced by melting and in the form of chunks or broken pieces, water and pulverulent and/or fibrous alkali soluble oxidic and/or siliceous materials and optionally present water-soluble organic compounds in a milling apparatus with steam at a vapor pressure of 2 to 6 atmospheres with statu nascendi formation of the water glass solution and simultaneous dissolution of oxidic and/or siliceous materials and drying the resulting solution to form a mixed silicate power having a moisture content of 1 to 25 percent and having a silicate to solid ratio of 1:0.02 – 0.8.

The steam pressure is preferably 3 to 5 atmospheres. The resulting powder contains three or more metals or metaloid oxidic compounds capable of forming glass and if desired may also have organic compounds distributed therein. If the solution is spray dried, the product will be obtained in powder form. If another type of drying such as drum drying is used, a grinding step may be necessary.

The water glass solution in statu nascendi, at the moment the broken glass pieces begin to dissolve, has surprisingly a greater and more rapid dissolution capacity for oxidic and/or siliceous materials than the diluted water glass solution used by the prior art. Since the concentration of the undissolved chuck glass and the diluted solution occur particularly quickly, the separate and distinct disintegration process can be combined with the water glass dissolving process and thereby the process is substantially simplified.

The alkali metal silicate produced by melting and in the form of broken chunks preferably has a high content of silica and an $Na_2O : SiO_2$ ratio greater than 1:3.2, preferably 1:3.2 to 4.0. The dissolution is preferably effected in a rotary autoclave containing sufficient water but any apparatus may be used where the surface of the alkali metal silicate is constantly renewed.

For the disintegration process, examples of suitable oxidic materials are zinc oxide, borax, aluminum oxide hydrate, lead oxide and other alkali-soluble oxides. Examples of suitable siliceous materials which may be fibrous or pulverulent are stone wool, basalt wool, glass wool, slag wool, slag powder, powdered rock, powdered glass, etc. The water resistance of the final product increases with the contact of the oxidic and/or siliceous material.

Examples of suitable water-soluble organic compounds which can be used as blowing agents for the glass powder products are sugar, molasses, glycerin, glycol, etc. The products may contain up to 5 percent by weight of the organic compound.

The dissolving temperature in the rotary autoclave is determined by the steam pressure after the charge is heated. The alkali metal silicate in the broken glass is dissolved first and then it attacks the solid substances to dissolve them. The rolling of the chunks in the autoclave constantly renews the surface thereof to maintain statu nascendi dissolution which increases the dissolution capacity for the oxidic or siliceous materials.

The resulting water glass solution is generally turbid and is about 35°–40° Be and may be spray dried to obtain a fine powder having the desired water content. The product, when using other drying methods such as a drum drier, must be ground to obtain a pulverulent product. The said product is a hydrous mixed silicate which due to the molecular distribution of the glass-forming oxides produces upon heating to its melting temperatures a homogeneous glass composition within a few minutes.

The powdered product resulting from the process can be used as a filler for fireproofing agents or as a raw material for the production of foam glass when in the shape of sheets or granules. The powder is less soluble in water than pure water glass powder with the same moisture content. The characteristics of the powdered product may be varied over a wide range by changing the types and amounts of oxidic material. For example, the water resistance, melting point of the foamed glass, resistance to atmospheric influences and compatibility with binding agents may be controlled so that optimal products for any field can be obtained. Also, the absorptive capacity for liquids and the loading capacity of any type of product can be varied over a wide range.

The process is applicable for producing the products and/or their applications described in U.S. Pat. Nos. 3,184,371; 3,261,894 and 3,546,061 and commonly assigned U.S. Pat. applications Ser. No. 778,800 filed Nov. 25, 1968, now abandoned, Ser. No. 801,759 filed Feb. 24, 1969, now abandoned, Ser. No. 803,477 filed Feb. 28, 1969, now U.S. Pat. No. 3,589,844 and Ser.

No. 8,435 filed Feb. 3, 1970, now U.S. Pat. No. 3,652,310.

In the following examples there are described several preferred embodiments to illustrate the invention. However, it should be understood that the invention is not intended to be limited to the specific embodiments.

EXAMPLE I 9 cubic meters of water, 6 metric tons of broken glass with grain sizes up to 100 mm circumference, 600 kilograms of slag powder, 100 kilograms of zinc oxide, 400 kilograms of borax and 70 kilograms of sugar were added to a 20-cubic meter rotating autoclave and after closing, steam saturated at 2.8 atmospheres was introduced in the continuously rotating autoclave. Complete dissolution occurred in 3 hours at an interior temperature of 140°C and the addition of steam was halted. The resulting solution was placed in a heated storage tank equipped with a stirrer and the solution was pumped on to the centrifugal plate of a spraydrying tower with an exhaust air of 150°C. The resulting product was a very light powder having a water content of 18 percent by weight.

EXAMPLE II

Using the procedure of Example I, 5000 kilograms of broken glass with a grain size up to 100 mm, 400 Kg of stone wool, 200 kg of powdered stone, 200 kg of powdered zinc oxide, 50 kg of glycerin and 11,000 kg of water were reacted at a steam pressure of 2 atmospheres for 5 hours to obtain dissolution. The solution was spray-dried with an exhaust gas temperature of 150°C to obtain a very light powder containing 11.5 percent by weight of water and having a glass-to-solid ratio of 1:0.16.

EXAMPLE III

Using the procedure of Example I, a solution of 5,200 Kg of broken glass, 700 Kg of powdered basalt, 300 Kg of borax (10 $H_2O$) and 150 Kg of lead oxide, 40 Kg of glycol and 11,000 Kg of water was prepared at a steam pressure of 4 atmospheres and a dissolution time of 6 hours. The solution was spray-dried with an exhaust gas temperature of 230°C to obtain a powder having a moisture content of 7.5 percent and a glass:solid ratio of 1:0.21.

EXAMPLE IV

Using the procedure of Example I, a solution of 4,000 Kg of broken glass, 600 Kg of powdered slag, 300 Kg of zinc oxide and 500 Kg of Rasorit (borax .5$H_2O$), 60 Kg of molasses and 12,000 Kg of water was prepared at a steam pressure of 3.2 atmospheres and a dissolution time of 4.5 hours. The solution was spray-dried at an exhaust temperature of 160°C to obtain a powdered product having a moisture content of 13.5 percent and a glass:solid ratio of 1:0.32.

EXAMPLE V

Using the procedure of Example I, a solution of 3,000 Kg of broken glass, 1,000 Kg of electrostatic fly ash, 200 Kg of borax .10 $H_2O$, 100 Kg of hydrated clay, 60 Kg of sugar and 10,000 Kg of water was prepared at a steam pressure of 2.5 atmospheres and a dissolution time of 6 hours. The solution was spray-dried at an exhaust gas temperature of 105°C to obtain a powder having a moisture content of 19 percent and a glass:solid ratio of 1:0.42.

EXAMPLE VI

Using the procedure of Example I, a solution of 2,500 Kg of broken glass, 1,500 Kg of electrostatic fly ash, 300 Kg of Kernit (Na$B_4O_7$ . 4$H_2O$) and 10,500 Kg of water was prepared at a steam pressure of 3 atmospheres and a dissolution time of 3 hours. The solution was spray-dried at an exhaust gas temperature of 145°C to obtain a powder having a moisture content of 16 percent and a glass:solid ratio of 1:0.7.

Various modifications of the process of the invention such as using drum driers may be made without departing from the spirit or scope thereof and it should be understood that the invention is intended to be limited only as defined in the appended claims.

We claim:

1. A process for the preparation of a hydrous mixed silicate comprising admixing alkali metal silicates in the form of chunks or broken pieces, water and at least one member of the group consisting of alkali solution oxidic and siliceous materials in fibrous or pulverulent form and mixtures thereof and optionally present watersoluble organic compounds in a milling apparatus with steam at a vapor pressure of 2 to 6 atmospheres with statu nascendi formation of a water glass solution and simultaneous dissolution of oxidic and/or siliceous materials and drying the resulting solution to form a mixed silicate powder having a moisture content of 1 to 25 percent and having a silicate to solid ratio of 1:0.02–0.8.

2. The process of claim 1 wherein the steam pressure is 3 to 5 atmospheres.

3. The process of claim 1 wherein the alkali metal silicate has an $Na_2O:SiO_2$ ratio greater than 1:3.2.

4. The process of claim 1 wherein the oxidic material is selected from the group consisting of zinc oxide, borax, aluminum oxide hydrate and lead oxide.

5. The process of claim 1 wherein the water-soluble, organic compound is selected from the group consisting of glycerin, glycol, sugar and molasses.

6. The process of claim 1 wherein the siliceous material is selected from the group consisting of stone wool, basalt wool, glass wool, slag wool, powdered slag, powdered glass and powdered rock.

7. A process for the preparation of a hydrous mixed silicate comprising admixing alkali metal silicates in the form of chunks or broken pieces, water and at least one member of the group consisting of alkali soluble oxidic and siliceous materials in fibrous or pulverulent form and mixtures thereof and optionally present water-soluble organic compounds in a milling apparatus with steam at a vapor pressure of 2 to 6 atmospheres with statu nascendi formation of a water glass solution and simultaneous dissolution of said oxidic and siliceous materials and drying the resulting solution to form a mixed silicate powder having a moisture content of 1 to 25 percent and having a silicate to solid ratio of 1:0.2–0.8, said siliceous material being selected from the group consisting of stone wool, basalt wool, glass wool, slag wool, powdered slag, powdered glass and powdered rock and said oxidic material being selected from the group consisting of zinc oxide, borax, aluminum oxide hydrate and lead oxide.

* * * * *